(12) United States Patent
Kawata

(10) Patent No.: US 11,349,415 B2
(45) Date of Patent: May 31, 2022

(54) ELECTRIC COMPRESSOR

(71) Applicant: SANDEN AUTOMOTIVE COMPONENTS CORPORATION, Isesaki (JP)

(72) Inventor: Junki Kawata, Isesaki (JP)

(73) Assignee: SANDEN AUTOMOTIVE COMPONENTS CORPORATION, Isesaki (JP)

( * ) Notice: Subject to any disclaimer, the term of this patent is extended or adjusted under 35 U.S.C. 154(b) by 128 days.

(21) Appl. No.: 16/961,163

(22) PCT Filed: Dec. 7, 2018

(86) PCT No.: PCT/JP2018/046225
§ 371 (c)(1),
(2) Date: Jul. 9, 2020

(87) PCT Pub. No.: WO2019/150793
PCT Pub. Date: Aug. 8, 2019

(65) Prior Publication Data
US 2020/0366220 A1    Nov. 19, 2020

(30) Foreign Application Priority Data
Jan. 30, 2018    (JP) .............................. JP2018-014074

(51) Int. Cl.
*H02P 3/22* (2006.01)
*F25B 31/02* (2006.01)
(Continued)

(52) U.S. Cl.
CPC ............. *H02P 3/22* (2013.01); *B60H 1/3205* (2013.01); *F25B 31/026* (2013.01); *F25B 49/025* (2013.01)

(58) Field of Classification Search
CPC ........ H02P 3/22; F25B 49/025; F25B 31/026; B60H 1/3205
(Continued)

(56) References Cited

U.S. PATENT DOCUMENTS 7,414,425 B2 *  8/2008  O'Gorman ................ H02P 3/22
                                                        324/765.01
2003/0052632 A1    3/2003  Wissmach et al.
(Continued)

FOREIGN PATENT DOCUMENTS

DE      10134454 A1      2/2003
JP      H07322411 A  *  12/1995
(Continued)

OTHER PUBLICATIONS

Japan Patent Office, International Search Report issued in International Application No. PCT/JP2018/046225, dated Mar. 19, 2019.
(Continued)

*Primary Examiner* — Jorge L Carrasquillo
(74) *Attorney, Agent, or Firm* — Baker Botts L.L.P.

(57) ABSTRACT

The present invention quickly stops rotation of an electric compressor while preventing damage to switching elements. An electric compressor 1 comprises a motor drive circuit 52 having multiple switching elements IGBT Q1 to Q6, a control unit 53 that controls driving of the multiple switching elements IGBT Q1 to Q6 and drives a motor 4, and a current detection unit 54 that detects a current flowing through the motor drive circuit 52. The control unit 53 performs stop control that stops rotation of the compression mechanism 3 by performing braking control that controls drive of predetermined switching elements IGBT (Q2, Q4, Q6 and the like) among the multiple switching elements IGBT Q1 to Q6. In the brake control, when the detected current value I is lower than the first threshold $I_1$, the control unit 53 adjusts the drive pattern of the predetermined switching elements IGBT (Q2, Q4, Q6 and the like) in order to prevent the detected current value I from exceeding the second threshold $I_2$ that is lower than the first threshold $I_1$.

9 Claims, 6 Drawing Sheets

(51) Int. Cl.
*F25B 49/02* (2006.01)
*B60H 1/32* (2006.01)

(58) Field of Classification Search
USPC .......................................................... 318/379
See application file for complete search history.

(56) References Cited

U.S. PATENT DOCUMENTS

| | | | |
|---|---|---|---|
| 2011/0227513 A1* | 9/2011 | Onuma | H02P 3/18 |
| | | | 318/375 |
| 2013/0127380 A1 | 5/2013 | Onuma et al. | |
| 2018/0026558 A1 | 1/2018 | Katayama | |

FOREIGN PATENT DOCUMENTS

| | | | |
|---|---|---|---|
| JP | 2000-287485 | | 10/2000 |
| JP | 2005001823 A | * | 1/2005 |
| JP | 2011-101446 A | | 5/2011 |
| JP | 2015-126592 A | | 7/2015 |
| JP | 2018-014802 A | | 1/2018 |

OTHER PUBLICATIONS

Office Action dated Nov. 18, 2021 for German Patent Application No. 11 2018 006 979.6.

* cited by examiner

ELECTRIC COMPRESSOR

CROSS-REFERENCE TO RELATED APPLICATIONS

This application is a U.S. National Stage Patent Application under 35 U.S.C. § 371 of International Patent Application No. PCT/JP2018/046225, filed on Dec. 7, 2018, which claims the benefit of Japanese Patent Application No. 2018-014074, filed on Jan. 30, 2018, the disclosures of each of which are incorporated herein by reference in their entirety.

TECHNICAL FIELD

The present invention relates to an electric compressor provided with an inverter and a motor for compressing a refrigerant in a vehicle air conditioner or the like and more specifically, relates to brake control of the motor.

BACKGROUND ART

For example, an electric compressor disclosed in Patent Document 1 is known. According to Patent Document 1, the inverter converts a direct-current power from a direct-current power source into a three-phase alternating current power to feed a motor for driving the compressor. With such an electric compressor, it is known that when the compressor stops, a compression mechanism rotates in reverse due to the pressure difference between the intake and discharge pressure areas of the refrigerant in the compression mechanism, and abnormal noise may occur due to the reverse rotation.

In order to prevent the reverse rotation and abnormal noise from occurring in the electric compressor disclosed in Patent Document 1, brake control is performed when the compressor stops. Specifically, when an external compressor stop command is input, the electric compressor shuts off supply of electricity to multiple switching elements which constitute the inverter, and then performs zero-vector energization or direct-current excitation energization as the brake control. That is, the electric compressor prevents the reverse rotation of the compression mechanism by energizing all the switching elements on the positive or negative voltage side of the multiple switching elements in the zero-vector energization, and by energizing one of the switching elements on the positive voltage side and one of the switching elements on the negative voltage side in the direct-current excitation energization.

REFERENCE DOCUMENT LIST

Patent Document

Patent Document 1: JP 2000-287485 A

SUMMARY OF THE INVENTION

Problem to be Solved by the Invention

However, when the energization to all the switching elements is shut off in response to the compressor stop command from the outside as in the electric compressor disclosed in Patent Document 1, the compression mechanism keeps rotating by inertia. Therefore, when the brake control (the zero-vector energization or direct-current excitation energization) is performed in this state, the rotational energy of the compression mechanism appears as a current flowing in the circuit of the inverter (which can also be called the regenerative current). Therefore, when the rotation of the compression mechanism suddenly stops as a result of the brake control, the current flowing in the circuit of the inverter rapidly increases, and an excessive current may flow in the switching elements which constitute the inverter circuit. In this case, the switching elements may be damaged, and a solution to such situation needs to be devised.

In view of such circumstances as described above, an object of the present invention is to provide an electric compressor which can quickly stop the rotation of a compression mechanism while preventing damage to switching elements.

Means for Solving the Problem

According to one aspect of the present invention, an electric compressor is provided comprising: a compression mechanism for compressing and discharging a refrigerant by rotation; a motor for driving the compression mechanism; a motor drive circuit that is connected between the motor and a direct-current power source and provided with multiple switching elements; and a control unit for performing motor drive control and stop control, wherein the motor drive control drives the motor by controlling drive of the multiple switching elements in response to an external compressor operation command, and the stop control stops rotation of the compression mechanism by performing brake control that turns all the switching elements to an OFF state in response to an external compressor stop command and then controls driving of a predetermined switching element among the multiple switching elements to apply a load to the motor. The electric compressor includes a current detection unit that detects a current flowing through the motor drive circuit. The control unit, in the brake control, turns all the switching elements to the OFF state when a detected current value that is detected by the current detection unit is higher than a predetermined first threshold. The control unit, in the brake control, adjusts a drive pattern of the predetermined switching element in order to prevent the detected current value from exceeding a predetermined second threshold that is lower than the first threshold when the detected current value is lower than the first threshold.

Effects of the Invention

According to the electric compressor of one aspect of the present invention, in the brake control performed by the control unit, the control unit forcibly turns all the switching elements to the OFF state when the detected current value that is detected by the current detection unit is higher than a predetermined first threshold. Therefore, the damage to the switching elements can be reliably prevented, for example, by only setting the first threshold to the value that is sufficiently lower than the value at which the switching elements are damaged. Furthermore, in the brake control, when the detected current value is lower than the first threshold, the control unit adjusts the drive pattern of the predetermined switching elements in order to prevent the detected current value from exceeding a predetermined second threshold that is lower than the first threshold. Therefore, since it is possible to continue the brake control while reliably preventing the damage to the switching elements, the rotation of the compression mechanism can be quickly stopped, and the reverse rotation of the compression mechanism and the abnormal noise due to the reverse rotation can be quickly prevented or suppressed from occurring.

Therefore, an electric compressor which can quickly stop the rotation of the compression mechanism while reliably preventing damage to the switching elements can be provided.

MODE FOR CARRYING OUT THE INVENTION

Figure 1:
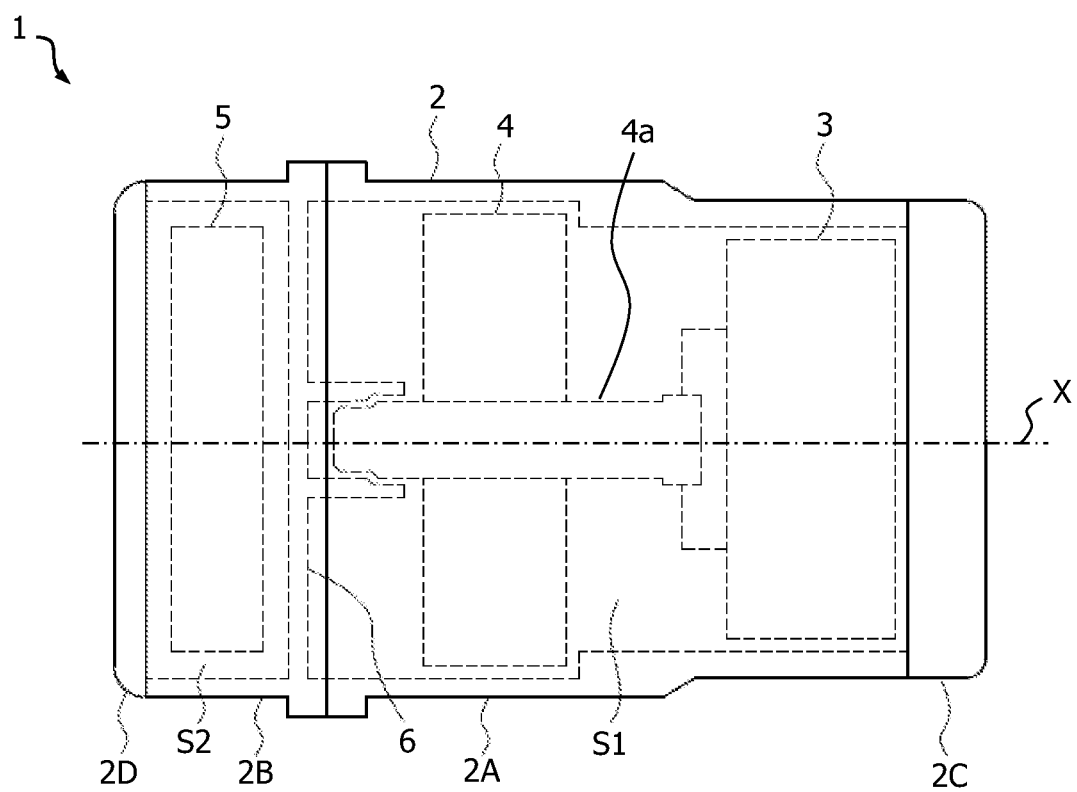
FIG. 1 is a schematic view illustrating the appearance of an electric compressor according to an embodiment of the present invention.

Hereinbelow, an embodiment of the present invention will be described in detail with reference to the accompanying drawings. FIG. 1 schematically illustrates the appearance of an electric compressor according to an embodiment of the present invention.

The electric compressor 1 of the present embodiment is incorporated into a refrigerant circuit of a vehicle air conditioner, for example, the electric compressor 1, taking in, compressing and discharging the refrigerant of the vehicle air conditioner. The electric compressor 1 is a so-called inverter-integrated electric compressor, and provided with a housing 2, a compression mechanism 3 for compressing and discharging the refrigerant by rotation, a motor 4 for driving the compression mechanism 3, and an inverter 5 for feeding the motor 4.

The housing 2 accommodates therein the compression mechanism 3, the motor 4, and the inverter 5. In the present embodiment, the housing 2 includes a main housing 2A, an inverter housing 2B, and lid members 2C, 2D. These members (2A to 2D) are integrally fastened by bolts or the like.

In the main housing 2A, the compression mechanism 3 and the motor 4 are accommodated. The compression mechanism 3 and the motor 4 are arranged in series along the axis X of a drive shaft 4a of the motor 4. In the inverter housing 2B, the inverter 5 is accommodated. In this way, in the housing 2, the motor 4 is disposed to be positioned between the compression mechanism 3 and the inverter 5. The inverter housing 2B has a cylindrical portion and a bottom wall portion on one end side of the cylindrical portion. An opening of the inverter housing 2B which is open on the other end side of the cylindrical portion is closed by the lid member 2D. Therefore, the area in the housing 2 is partitioned by the bottom wall portion of the inverter housing 2B into a first space S1 for accommodating the compression mechanism 3 and the motor 4, and a second space S2 for accommodating the inverter 5.

The compression mechanism 3 is, for example, a scroll-type compression mechanism having a fixed scroll and an orbiting scroll that are meshed with each other, and is joined to the drive shaft 4a. The orbiting scroll is joined to the drive shaft 4a so as to be able to revolve around the axis of the fixed scroll, and a compression chamber is formed between the orbiting scroll and the fixed scroll. The volume of the compression chamber is changed by the revolution of the orbiting scroll. The low-pressure refrigerant which is taken into the main housing 2A from the low-pressure portion of the refrigerant circuit via the intake port, not illustrated, is guided to the central portion of the compression mechanism 3 while being compressed in the compression chamber. The refrigerant guided to the central portion of the compression mechanism 3 is discharged to the high-pressure portion of the refrigerant circuit via the discharge port (not illustrated).

The motor 4 is, for example, a three-phase brushless motor, and has star-connected U-phase, V-phase, and W-phase coils.

Figure 2:
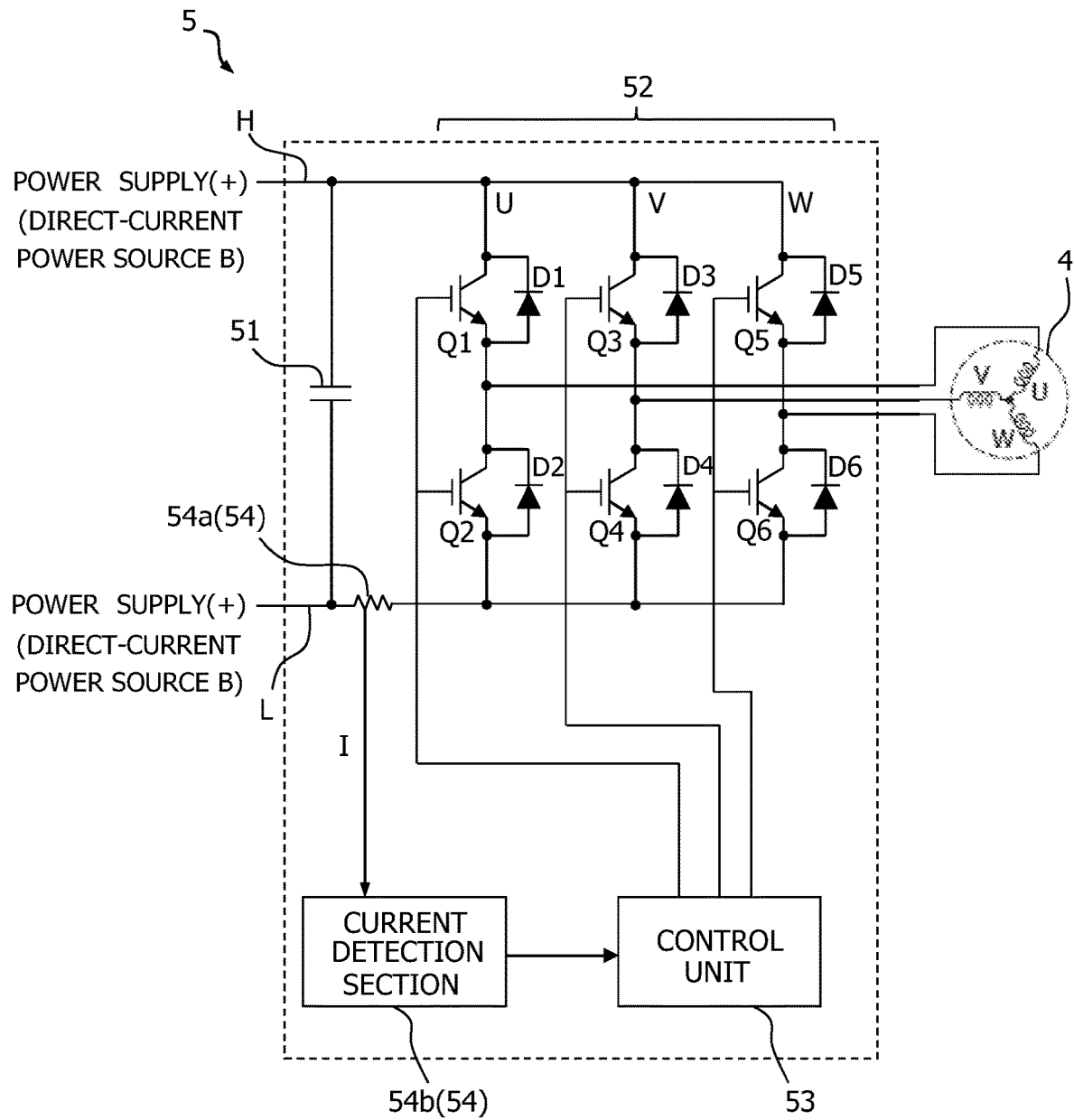
FIG. 2 is a schematic circuit diagram including a motor drive circuit of the electric compressor.

FIG. 2 is a schematic diagram of a circuit of the inverter 5 according to the present embodiment which includes a motor drive circuit 52, which will be described later.

The inverter 5 converts a direct-current power from an external direct-current power source B, such as a battery, not illustrated, into a three-phase alternating current power, to feed the motor 4. The circuit components of the inverter 5 include a smoothing capacitor 51, the motor drive circuit 52, a control unit 53 that controls drive of the motor drive circuit 52, and a current detection unit 54.

The capacitor 51 smooths the direct-current voltage from the external direct-current power source B and supplies the smoothed direct-current voltage to the motor drive circuit 52.

The motor drive circuit 52 is connected between the motor 4 and the direct-current power source B, and provided with the same insulated gate bipolar transistors (hereinafter, referred to as "IGBT") Q1 to Q6, as multiple power switching elements.

The respective drive (ON/OFF) of the IGBT Q1 to Q6 as the multiple switching elements are controlled by the control unit 53 so that the direct-current voltage from the capacitor 51 is converted into the alternating voltage and is supplied to the motor 4. The IGBTs Q1 to Q6 are sectioned into U-, V-, and W-phase arms which are connected in parallel with one another between a high-pressure line H (in other words, the high voltage side line) and a ground line L (in other words, the ground side line) of the direct-current power source B. The capacitor 51 is connected to the part that is closer to the direct-current power source B than the connection points of the U-phase arm in the high-voltage line H and the ground line L.

The U-phase arm includes two IGBTs (Q1, Q2) that are connected in series between the high-pressure line H and the ground line L. Diodes D1 and D2 are respectively connected in antiparallel to the two IGBTs (Q1 and Q2).

The V-phase arm also includes two IGBTs (Q3, Q4) that are connected in series between the high-pressure line H and the ground line L. Diodes D3 and D4 are respectively connected in antiparallel to the two IGBTs (Q3 and Q4).

The W-phase arm also includes two IGBTs (Q5, Q6) that are connected in series between the high-pressure line H and the ground line L. Diodes D5 and D6 are respectively connected in antiparallel to the two IGBTs (Q5 and Q6).

In the present embodiment, the IGBTs (Q1, Q3, Q5) correspond to "high-side elements" (in other words, power source-side elements) of the present invention, the IGBTs (Q2, Q4, Q6) correspond to "low-side elements" (in other words, ground-side elements) of the present invention, and each of the IGBTs (Q1, Q2), the IGBTs (Q3, Q4) and the IGBTs (Q5, Q6) corresponds to a "pair of high-side and low-side elements in the same phase" of the present invention. In this way, the motor drive circuit 52 is configured to include the pairs of high-side and low-side elements (IGBTs (Q1, Q2), IGBTs (Q3, Q4), IGBTs (Q5, Q6)) in the same phases that are connected in series between the high-pressure line H and ground line L of the direct-current power source B and are provided in parallel for three phases.

Each midpoint of the U-, V-, and W-phase arms is connected to one end of the corresponding U-, V-, and W-phase coil of the motor 4. That is, the midpoint of the IGBTs (Q1, Q2) is connected to the U-phase coil, the midpoint of the IGBTs (Q3, Q4) is connected to the V-phase coil, and the midpoint of the IGBTs (Q5, Q6) is connected to the W-phase coil.

The control unit 53 controls drive of the motor drive circuit 52, and performs motor drive control for driving the motor 4 by supplying power to the motor 4 and stop control for stopping rotation of the compression mechanism 3 (specifically, the revolution of the orbiting scroll).

In the motor drive control, the control unit 53, in response to the compressor operation command from the outside such as the vehicle air conditioner control unit, controls the drive of the IGBTs Q1 to Q6 as the multiple switching elements to drive the motor 4. For example, in the motor drive control, the control unit 53 performs PWM control (a control that generates a voltage with a pulse width modulated in a constant period to artificially obtain a sine wave) for the IGBTs Q1 to Q6 to convert the direct-current voltage from the capacitor 51 into the alternating voltage and supplies the alternating voltage to the motor 4 to drive the motor 4. Specifically, in the motor drive control, the control unit 53 generates a pseudo-alternating current voltage by controlling, for each arm of each phase, the ratio of an ON-period (energization period) of the IGBTs (Q1, Q3, Q5) as the high-side elements to an ON-period (energization period) of the IGBTs (Q2, Q4, Q6) as the low-side elements, depending on a sine wave voltage added to each of U-, V-, and W-phases.

In the stop control, the control unit 53 stops the rotation of the compression mechanism 3 (the revolution of the orbiting scroll) by performing brake control. The brake control turns all the IGBTs Q1 to Q6 to the OFF state (energization shutoff state) in response to the compressor stop command from the outside such as the vehicle air conditioner control unit, and then controls the drive of the predetermined switching elements (hereinafter, referred to as the brake control elements as appropriate) of the IGBTs Q1 to Q6 to apply a load to the motor 4. That is, when the signal of the compressor stop command is input from the outside during the motor drive control, the control unit 53 switches to the stop control mode, and first, controls the drive of the IGBTs Q1 to Q6 so that all the IGBTs Q1 to Q6 turn to the OFF state. As a result, the compression mechanism 3 turns to the inertial rotation state. The control unit 53 applies the load to the motor 4 by performing the brake control that controls the drive of the brake control elements while the compression mechanism 3 is inertially rotating. As a result, the braking force for the inertial rotation of the compression mechanism 3 that is joined to the motor 4 is generated, and the rotation of the compression mechanism 3 stops. The magnitude of the braking force for the rotation of the compression mechanism 3 which is generated by the brake control is determined based on the characteristics of the compression mechanism 3 and motor 4, the ON period of the brake control elements, and the like. The details of the stop control including the brake control and the brake control elements in the control unit 53 will be further described later.

The current detection unit 54 is for detecting the current that flows in the motor drive circuit 52, and can adopt an appropriate system such as a detection system that uses the shunt resistor provided in the motor drive circuit 52 and a detection system that uses a current sensor. In the present embodiment, the current detection unit 54 employs a so-called one-shunt system that uses the shunt resistor. Specifically, the current detection unit 54 consists of one shunt resistor 54a that is provided in the ground line L for connecting the motor drive circuit 52 and the ground side of the direct-current power source B, and a current detection section 54b that detects the current (phase current) that flows in the shunt resistor 54a. The signal corresponding to the detected current value I that is detected by the current detection section 54b is input to the control unit 53. When using the shunt resistor, the three-shunt system may be employed instead of the one-shunt system. In that case, although not illustrated, the shunt resistor 54a is provided between each IGBT (Q2, Q4, Q6) as the low-side element in the motor drive circuit 52 and the ground line L.

Figure 3:
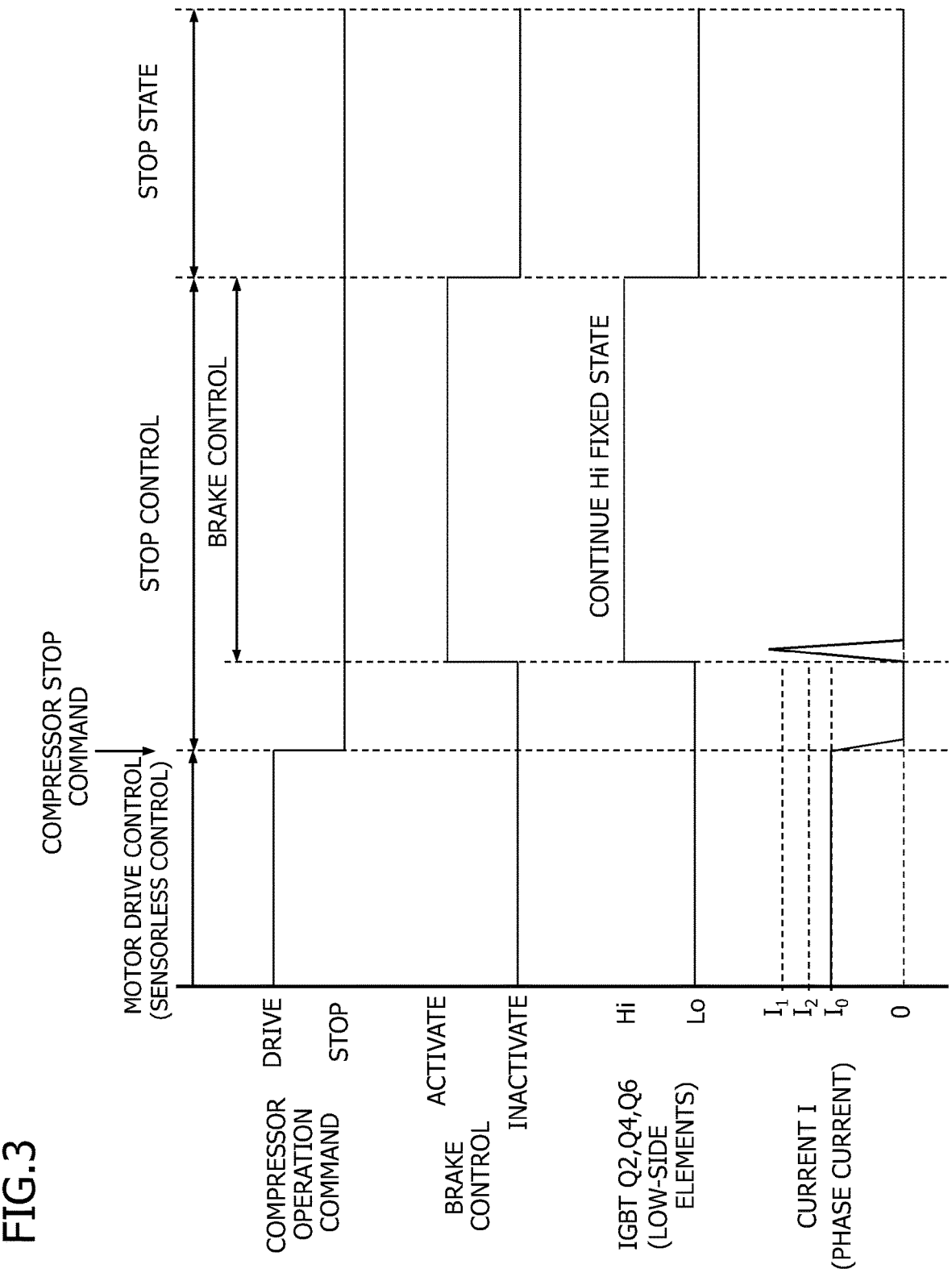
FIG. 3 is an image diagram illustrating a state when overcurrent flows in a motor drive circuit during stop control.

As described above, the compression mechanism 3 rotates by inertia after the control unit 53 drives all the IGBTs Q1 to Q6 to the OFF state in response to the compressor stop command from the outside. Therefore, in this state, as shown in FIG. 3, the brake control is performed, for example, by turning all the low-side or high-side elements (the low-side elements IGBT (Q2, Q4, Q6) in the case of FIG. 3) simultaneously to the ON state (in other words, the Hi state). In this case, the rotational energy of the compression mechanism 3 appears as the current (it can also be called the regenerative current) which flows through the motor drive circuit 52. Here, if the braking force for the rotation of the compression mechanism 3 which is generated by the brake control is excessive, the rotation of the compression mechanism 3 suddenly stops immediately after the start of the brake control. That is, as shown in FIG. 3, if the control unit 53 performs the brake control that simultaneously maintains the low-side elements IGBT (Q2, Q4, Q6) to be the ON state (in other words, drives the low-side elements at a duty ratio of 100%), the overcurrent flows through the motor drive circuit 52. The overcurrent appears as the sharp jump-up of the detected current value I which is detected by the current detection section 54b, as illustrated in the bottom of FIG. 3. As a result, the low-side elements IGBT (Q2, Q4, Q6) and the like may be damaged due to the overcurrent.

As a countermeasure against this problem, the control unit 53 in the present embodiment is configured to perform the control operation described in detail below.

Figure 4:
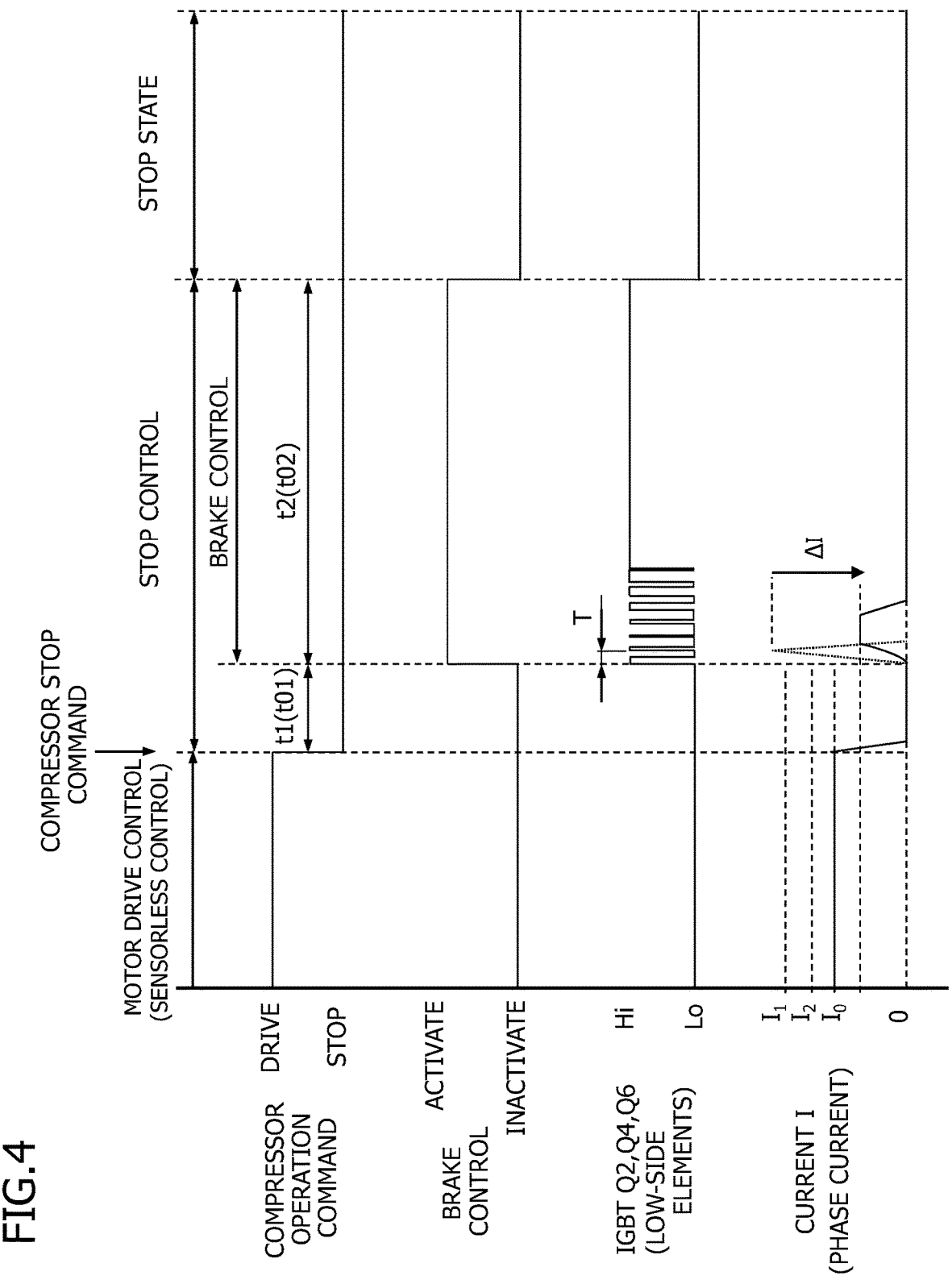
FIG. 4 is an image diagram illustrating a state in which the overcurrent is prevented from flowing in the motor drive circuit during stop control.

Next, the stop control including the brake control which is performed by the control unit 53 will be described in detail with reference to FIG. 4. FIG. 4 is the image diagram for describing the current that may flow through the motor drive circuit 52 during the stop control.

When the detected current value I detected by the current detection unit 54 is higher than the predetermined first threshold $I_1$ in the brake control which is a part of the stop control, the control unit 53 turns all the IGBTs Q1 to Q6 to the OFF state.

Furthermore, in the brake control, when the detected current value I is lower than the first threshold $I_1$, the control unit 53 adjusts the drive pattern of the brake control elements in order to prevent the detected current value I from exceeding a predetermined second threshold $I_2$ that is lower than the first threshold $I_1$. As a result, as illustrated in the bottom of FIG. 4, the peak value of the current flowing through the motor drive circuit 52 by the brake control is significantly lowered by ΔI than the peak value when the brake control elements are driven at a duty ratio of 100% as illustrated by a dotted line (in the case of FIG. 3).

In the present embodiment, the brake control elements as the predetermined switching elements that are subjected to adjusting the drive pattern are all the low-side elements IGBT (Q2, Q4, Q6).

In the present embodiment, the first threshold $I_1$ is set to the value lower than the current value that may damage the IGBTs, and for example, is set to the value corresponding to the abnormal current value that may occur when the motor 4 is overloaded. The second threshold $I_2$ is set to the peak value of the starting current that is generated at the time of starting the motor drive control. Since the current of the second threshold $I_2$ flows into the motor drive circuit 52 at the time of the start, the IGBTs having resistance to the current of the second threshold $I_2$ are selected as the IGBTs Q1 to Q6. Furthermore, the second threshold $I_2$ is higher than the rated current value $I_0$ that flows through the motor drive circuit 52 during the motor drive control after the start. That is, the relationship of the first threshold $I_1$>second threshold $I_2$>rated current value $I_0$ is established.

Specifically, the drive pattern of all the low-side elements IGBT (Q2, Q4, Q6) in the brake control is adjusted by changing the duty ratio D for each predetermined cycle T, and the duty ratio D indicates the percentage of time of all the low-side elements IGBT (Q2, Q4, Q6) in the ON state in a predetermined cycle T.

More specifically, at the start of the brake control, the control unit 53 turns all the low-side elements IGBT (Q2, Q4, Q6) to the ON state for the time period based on the initial duty ratio $D_0$ that is predetermined for the duty ratio D. The control unit 53 then increases the duty ratio D by a predetermined ratio ΔD when the detected current value I is lower than the second threshold $I_2$, and maintains the duty ratio D or decreases the duty ratio D by the predetermined ratio ΔD when the detected current value I is higher than the second threshold $I_2$. Note that the present embodiment described below is based on an example in which the control unit 53 decreases the duty ratio D by the predetermined ratio ΔD when the detected current value I is higher than the second threshold $I_2$.

More specifically, as the brake control, the control unit 53 performs zero-vector energization which simultaneously and intermittently turns all the low-side elements IGBT (Q2, Q4, Q6) to the ON state. That is, this zero-vector energization is not maintained as illustrated in FIG. 3 during the brake control, but is released (turned off) for a period (time) corresponding to the duty ratio D for every cycle T as illustrated in FIG. 4.

Figure 5:
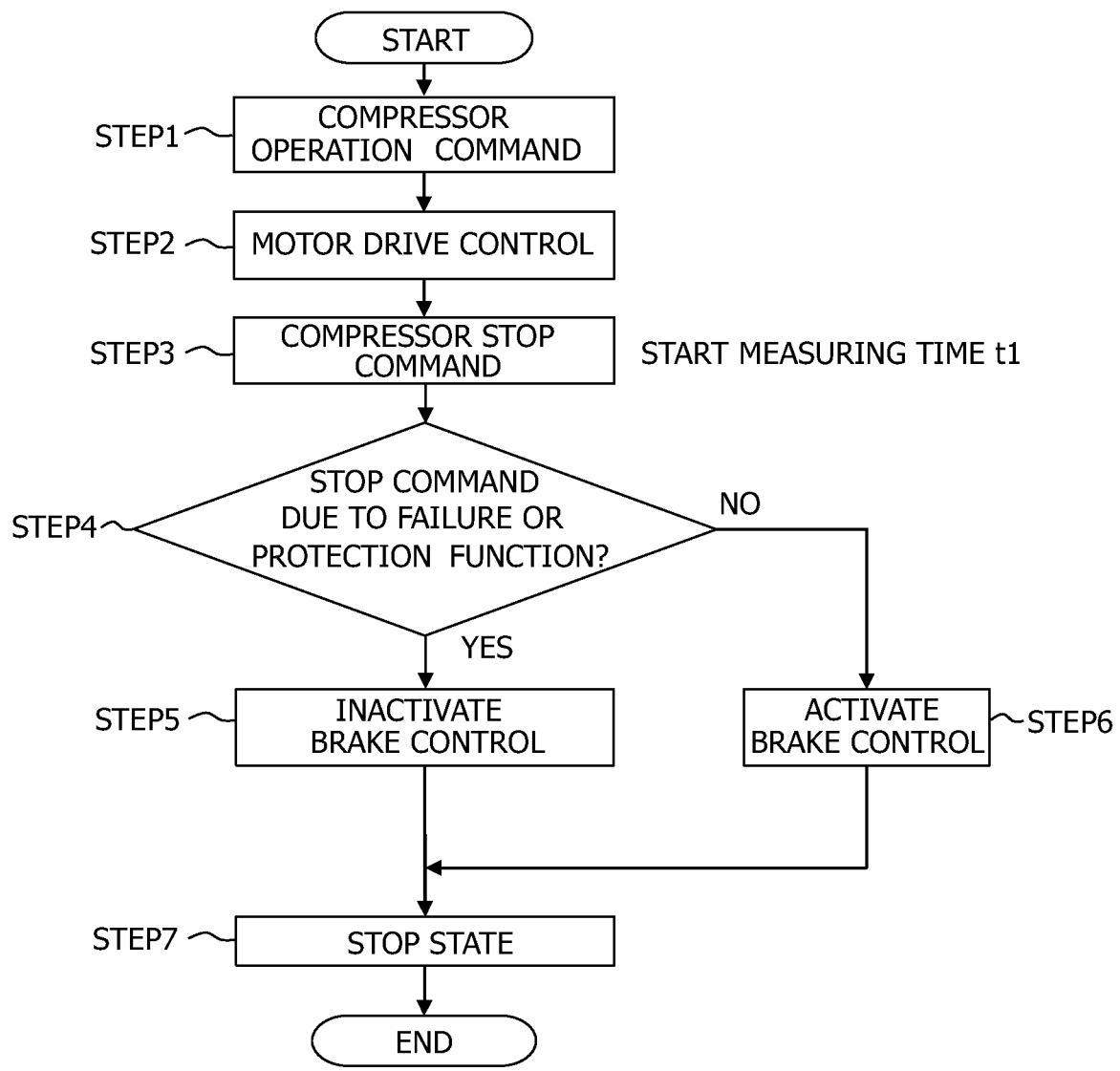
FIG. 5 is a flow chart for describing an outline of a control operation by the control unit.
Figure 6:
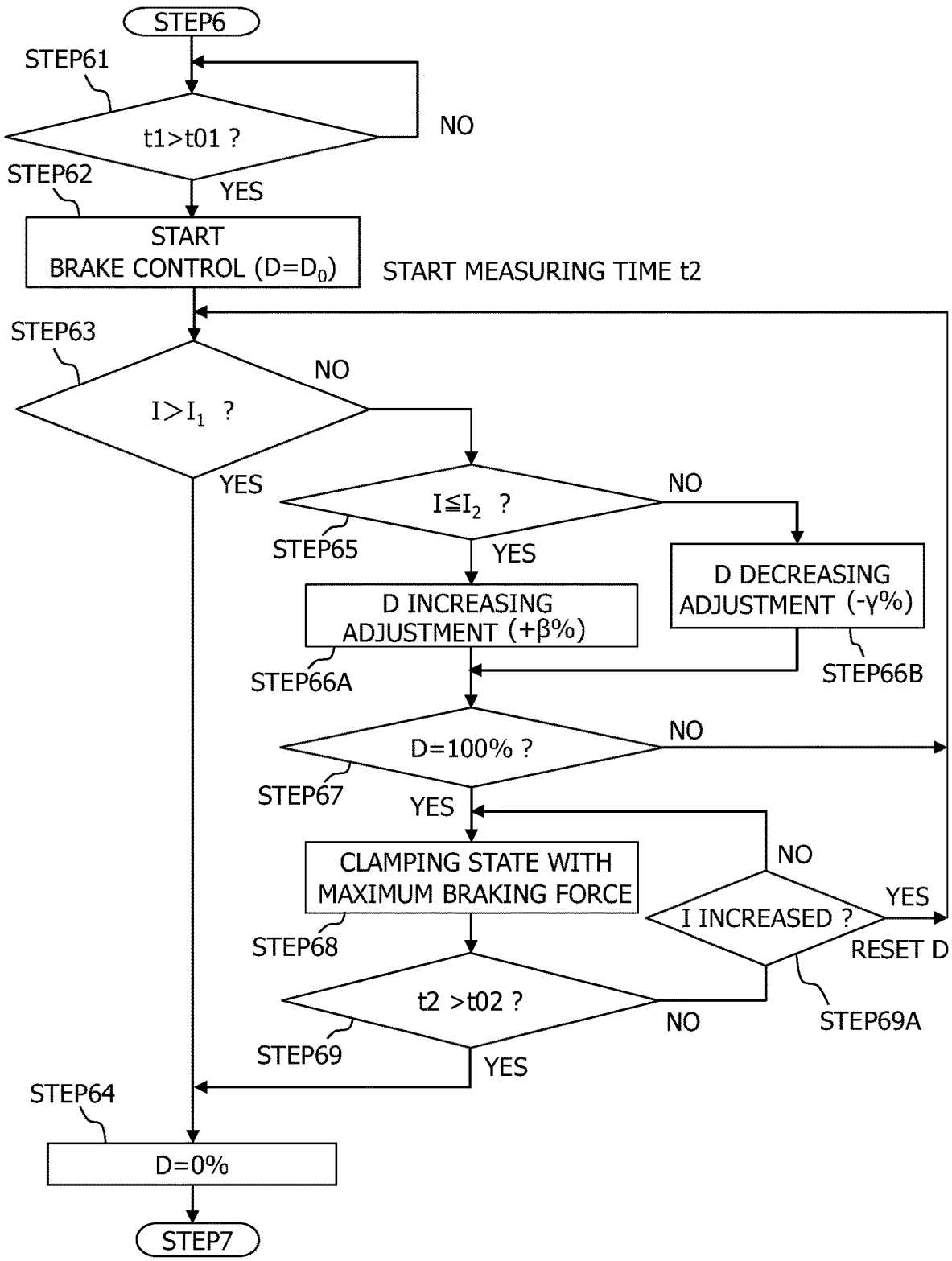
FIG. 6 is a flowchart for describing an operation of the stop control by the control unit.

Next, the control operation of the control unit 53 will be further described in detail with reference to FIGS. 4-6. FIG. 5 is a flow chart for describing the overall control operation of the control unit 53, and FIG. 6 is a flow chart for describing the stop control operation by the control unit 53. Steps 1 and 2 described below correspond to the motor drive control, and Steps 3 to 7 correspond to the stop control.

When the signal of the compressor operation command from the outside such as the vehicle air-conditioning control unit is input to the control unit 53 (Step 1), the motor drive control is performed by the control unit 53 so that the alternating-current power is fed to the motor 4 to drive (rotate) the motor 4 (Step 2).

When the signal of the compressor stop command from the outside, such as the vehicle air conditioner control unit, is input to the control unit 53 while performing the motor drive control, the control unit 53 is switched to the stop control mode. Then, in response to the signal of the compressor stop command, the control unit 53 immediately drives all the IGBTs Q1 to Q6 to the off state (energization shutoff state) (Step 3). At this time, the control unit 53 starts measuring time of time t1 from the input time of the compressor stop command, and proceeds to Step 4.

In Step 4, the control unit 53 determines whether the compressor stop command is the stop command due to the failure or protection function of the motor or the like. If it is so determined, that is, if the abnormal stop occurs (Step 4: YES), the process proceeds to Step 5; and if not so determined (Step 4: NO), the process proceeds to Step 6.

In Step 5, the control unit 53 does not perform the brake control (inactivate brake control). Thus, all the IGBTs Q1 to Q6 become the OFF state, the rotational frequency of the compression mechanism 3 gradually decreases, and the compression mechanism 3 stops rotating in the state in which the brake control is inactivated. In this case, the abnormality occurs in the electric compressor 1, and thus, in this state, in order to prevent the secondary failure or the like from occurring due to the brake control, the brake control is not performed.

In Step 6, the control unit 53 shifts to the state of brake control in the stop control (activate brake control). When the brake control is activated, the control unit 53 first determines, as illustrated in FIG. 6, whether the time t1 from the input time of the compressor stop command has passed a predetermined time t01 (t1>t01) (Step 61). If the time t1 has passed the predetermined time t01 (Step 61: YES), the control unit 53 proceeds to Step 62 and starts performing the brake control. On the other hand, if the time t1 has not passed the predetermined time t01 (Step 61: NO), the control unit 53 repeats Step 61 until the time has passed. When a predetermined time t01 has passed from the input time of the compressor stop command, the rotational frequency of the inertial rotation of the compression mechanism 3 is moderately lowered as compared to the rotational frequency immediately after the input of the compressor stop command. The predetermined time t01 can be appropriately determined according to the characteristics of the compression mechanism 3 and motor 4.

In Step 62, all the low-side elements IGBT (Q2, Q4, Q6) are driven to the ON state for the time period based on the initial duty ratio Do. At this time, all the high-side elements IGBT (Q1, Q3, Q5) are maintained in the OFF state. The initial duty ratio Do is preset to be changeable by the control unit 53, and is set to, for example, about 50%. The control unit 53 starts measuring time of time t2 from the start time of the brake control (that is, the time when all the low-side elements IGBT (Q2, Q4, Q6) are turned on), and proceeds to Step 63.

In Step 63, the control unit 53 determines whether the detected current value I which is detected by the current detection unit 54 is higher than the first threshold $I_1$. When the detected current value I is higher than the first threshold $I_1$ (Step 63: YES), the process proceeds to Step 64. When the detected current value I is lower than the first threshold $I_1$ (Step 63: NO), the process proceeds to Step 65.

In Step 64, the control unit 53 drives all the low-side elements IGBT (Q2, Q4, Q6) to the OFF state (in other words, the duty ratio D=0%). Thus, all the IGBTs Q1 to Q6 turn to the OFF state, and the control unit 53 completes the brake control. The control unit 53 proceeds to Step 7 and completes the stop control.

In Step 65, the control unit 53 determines whether or not the detected current value I is equal to or less than the second threshold $I_2$. If the detected current value I is equal to or less than the second threshold $I_2$ (Step 65: YES), the process proceeds to Step 66A, and if the detected current value I is not equal to or less than the second threshold $I_2$, in other words, if the detected current value I exceeds the second threshold $I_2$ (Step 65: NO), the process proceeds to Step 66B.

In Step 66A, since the detected current value I is equal to or less than the second threshold $I_2$, it is well accepted to increase the braking force by the brake control. Therefore, the control unit 53 increases the duty ratio D by a predetermined ratio $\Delta D$ (=$\beta$%). The $\Delta D$ for the increasing adjustment which is changeable based on the characteristics of the compression mechanism 3 and the motor 4 is preset in the control unit 53 together with the $\Delta D$ for the decreasing adjustment, to be described later. The $\Delta D$ for the increasing adjustment and the $\Delta D$ for the decreasing adjustment may have the same or different values. The control unit 53 drives all the low-side elements IGBT (Q2, Q4, Q6) to the ON state simultaneously with the duty ratio D which is increased from the previous value by $\Delta D$. Thus, the braking force is increased as compared to the last time. The control unit 53 adjusts the duty ratio D for every predetermined period T, and proceeds to Step 67.

Step 66B is performed when the detected currently value I exceeds the second threshold $I_2$ but NO in Step 63, that is, the detected current value I is lower than the first threshold $I_1$ ($I_2<I<I_1$). Therefore, although increasing the braking force by the brake control is somewhat accepted, in the present embodiment, the control for decreasing the braking force is performed in order to increase the certainty of preventing damage to the IGBTs. That is, the control unit 53 decreases the duty ratio D by the predetermined ratio $\Delta D$ (=$\gamma$%). The control unit 53 drives all the low-side elements IGBT (Q2, Q4, Q6) to the ON state simultaneously with the duty ratio D which is decreased from the previous value by $\Delta D$. Thus, the braking force is decreased as compared to the previous time. The control unit 53 adjusts the duty ratio D for every predetermined period T, and proceeds to Step 67.

In Step 67, the control unit 53 determines whether or not the current duty ratio D is 100%. When the current duty ratio D is 100% (Step 67: YES), the control unit 53 is in the state of clamping the compression mechanism 3 with the maximum braking force (Step 68). On the other hand, when the current duty ratio D is less than 100% (Step 67: NO), the process returns to Step 63, for example, and unless otherwise YES is determined in Step 63, the control unit 53 performs the increasing or decreasing adjustment of the duty ratio D (Step 66A, Step 66B) depending on the determination result in Step 65 until the current duty ratio D reaches 100% (Step 67: YES).

In Step 68, the control unit 53 is in the state of clamping the compression mechanism 3 with the maximum braking force, and proceeds to Step 69. In the state of clamping the compression mechanism 3 with the maximum braking force, the rotation of the compression mechanism 3 is not necessarily stopped, and the compression mechanism 3 may be inertially rotated in the state of positive rotation. The positive rotation is the rotation direction in the normal operating state of the compressor.

In Step 69, the control unit 53 determines whether or not the time t2 (braking time) from the start time of the brake control (that is, the time when all the low-side elements IGBT (Q2, Q4, Q6) are turned on) has passed the predetermined time t02 (t2>t02). When the time t2 has passed the time t02 (Step 69: YES), the control unit 53 proceeds to Step 64, turns all the IGBTs Q1 to Q6 to the OFF state, and completes the brake control. The control unit 53 then proceeds to Step 7 and completes the stop control.

On the other hand, when the time t2 has not passed the predetermined time t02 (Step 69: NO), the control unit 53 proceeds to Step 69A.

In Step 69A, the control unit 53 determines whether or not the detected current value I tends to increase. When the detected current value I tends to decrease or has no substantial change (Step 69A: NO), the control unit 53 returns to Step 68 and maintains clamping of the compression mechanism 3 with the maximum braking force.

On the other hand, when the detected current value I tends to increase (Step 69A: YES), the control unit 53, for example, resets the duty ratio D to the initial duty ratio Do and returns to Step 63. Then, unless otherwise YES is determined in Step 63, the control unit 53 performs the control of each Step described above until the time t2 reaches the time t02 (Step 69: YES). The predetermined time t02 can also be appropriately determined according to the characteristics of the compression mechanism 3 and motor 4.

Here, as described above, in Step 68, in the state of clamping the compression mechanism 3 with the maximum braking force, the compression mechanism 3 may be inertially rotated in the positive rotation. Therefore, this state needs to be maintained for a predetermined time after the maximum braking force is reached, in order to reliably stop the inertial rotation of the compression mechanism 3. Therefore, in Step 69, the control unit 53 determines whether or not the time t2 from the start time of the brake control has passed the sufficient braking time (time t02).

Furthermore, even if the compression mechanism 3 that is inertially rotated in the positive rotation stops rotating, in the case of the scroll-type compression mechanism 3, the communication between the high-pressure discharge pressure area and the low-pressure intake pressure area is maintained when the orbiting scroll stops rotating while the orbiting angular position of the orbiting scroll with respect to the fixed scroll is in a predetermined angular range. As a result, due to the pressure difference between the discharge pressure area and the intake pressure area, the orbiting scroll that has once stopped may start to rotate in reverse. In the present embodiment, this reverse rotation can be sensed in Step 69A as described below. That is, the positive rotation of the compression mechanism 3 stops before the time t2 from the start time of the brake control reaches the predetermined time t02. In this state, the detected current value I is zero or substantially zero. If the orbiting scroll of the compression mechanism 3 stops within the predetermined angular range which may rotate the orbiting scroll in reverse due to the pressure difference, for example, the orbiting scroll starts to rotate in reverse. At this time, the reverse rotation generates the regenerative current, and as a result, the detected current value I starts to increase. Step 69A senses the reverse rotation of the compression mechanism 3 by sensing the increase in the detected current value I (Step 69A: YES). Then, the control unit 53 resets the duty ratio D to the initial duty ratio $D_0$, performs the brake control with respect to this reverse rotation, and quickly stops the reverse rotation to suppress or prevent the abnormal noise from occurring.

In other words, in the present embodiment, the control unit 53 stops the brake control if the braking force for the compression mechanism 3 which is generated by the brake control reaches the maximum (Step 67: YES) and then the state in which no increase in the detected current value is sensed (Step 69A: NO) continues from the start time of the brake control until the predetermined time t02 has passed (Step 69: YES); and the control unit 53 continues the brake control if the braking force for the compression mechanism which is generated by the brake control reaches the maximum (Step 67: YES) and an increase in the detected current value I is sensed (Step 69A: YES) before the passage of the predetermined time t02 from the start time of the brake control (Step 69: NO).

In order to prevent the reverse rotation, for example, a sensor or the like for sensing the rotational position of the crank pin or the like for revolving the orbiting scroll is provided. The control unit 53 uses the sensor or the like to constantly monitor the orbiting angular position of the orbiting scroll, and may control the drive of the IGBTs so as to generate the maximum braking force at the timing when the orbiting scroll stops in the angle range other than the predetermined angle range.

According to the electric compressor 1 of the present embodiment, when the detected current value I is higher than the first threshold $I_1$ in the brake control performed by the control unit 53, all the IGBTs Q1 to Q6 are forcibly turned to the OFF state by the control unit 53. Therefore, for example, the damage to the IGBTs can be reliably prevented by simply setting the first threshold $I_1$ to the value that is sufficiently lower than the value at which the IGBTs are damaged. Furthermore, in the brake control, when the detected current value I is lower than the first threshold $I_1$, the drive pattern of all the low-side elements IGBT (Q2, Q4, Q6) is adjusted by the control unit 53 in order to prevent the detected current value I from exceeding the predetermined second threshold $I_2$ that is lower than the first threshold $I_1$. Therefore, since it is possible to continue the brake control while reliably preventing the IGBTs from being damaged, the rotation of the compression mechanism 3 can be quickly stopped, and the reverse rotation of the compression mechanism 3 and the abnormal noise due to the reverse rotation can be quickly prevented or suppressed from occurring. In this way, the electric compressor 1, which can quickly stop the rotation of the compression mechanism 3 while reliably preventing damage to the IGBTs as the switching elements, can be provided.

Furthermore, in the present embodiment, the second threshold $I_2$ is the peak value of the starting current that is generated at the time of starting the motor drive control. In this way, since the value of the current flowing through the motor drive circuit 52 by the brake control can be generally suppressed to the value close to the starting current that occurs during normal operation, the damage to the IGBTs can be more reliably prevented.

In the present embodiment, the drive pattern of all the low-side elements IGBT (Q2, Q4, Q6) in the brake control is adjusted by changing the duty ratio D for each predetermined cycle T. In this way, the adjustment of the drive pattern can be easily performed.

In the present embodiment, the control unit 53 turns all the low-side elements IGBT (Q2, Q4, Q6) to the ON state for the time period based on the predetermined initial duty ratio $D_0$ at the start of the brake control. In this way, the value of the current flowing through the motor drive circuit 52 at the start of the brake control can reliably be suppressed to a value that is sufficiently lower than the first threshold $I_1$ by only setting the initial duty ratio Do to a value that is sufficiently lower than 100% (50% in the present embodiment), and thus, the damage to the IGBTs can be more reliably prevented.

In the present embodiment, the control unit 53 starts the brake control from the initial duty ratio $D_0$, and turns all the low-side elements IGBT (Q2, Q4, Q6) to the ON state for the time period based on the initial duty ratio $D_0$. Then, the control unit 53 increases the duty ratio D by the predetermined ratio $\Delta D$ when the detected current value I is lower than the second threshold $I_2$, and decreases the duty ratio D by the predetermined ratio $\Delta D$ when the detected current value I is higher than the second threshold $I_2$. That is, the braking force is increased when it is well accepted to increase the braking force by the brake control ($I \leq I_2$), and the braking force is decreased for safety in other occasions. In this way, the rotation of the compression mechanism 3 can be more quickly stopped, and the risk of damage to the IGBTs can be more reliably reduced.

Furthermore, in the present embodiment, the brake control elements as the predetermined switching elements that are subjected to adjusting the drive pattern are all the low-side elements IGBT (Q2, Q4, Q6); however, the brake control elements are not limited to this, and may be all the high-side elements IGBT (Q1, Q3, Q5).

Furthermore, in the present embodiment, in Step 66B, the control unit 53 decreases the duty ratio D by the predetermined ratio $\Delta D$ when the detected current value I is higher than the second threshold $I_2$; however, the control unit 53 is not limited to this. In Step 66B, the control unit 53 may maintain the duty ratio D at the previous value when the detected current value I is higher than the second threshold $I_2$.

Furthermore, in the present embodiment, as the brake control, the control unit 53 performs zero-vector energization which simultaneously and intermittently turns all the low-side elements IGBT (Q2, Q4, Q6) or all the high-side elements to the ON state; however, the control unit 53 is not limited to this. The control unit 53, for example, may intermittently drive (1) one of the high-side elements IGBT (Q1, Q3, Q5) and one of the low-side elements IGBT (Q2, Q4, Q6) to the ON state, (2) two of the high-side element IGBT (Q1, Q3, Q5) and one of the low-side elements IGBT (Q2, Q4, Q6) to the ON state, or (3) one of the high-side element IGBT (Q1, Q3, Q5) and two of the low-side elements IGBT (Q2, Q4, Q6) to the ON state. In these cases, the IGBTs to be driven are determined so as not to simultaneously turn the high-side and low-side elements of the same phase to the ON state. That is, for example, in the case in which one of the high-side elements IGBT (Q1, Q3, Q5) and one of the low-side elements IGBT (Q2, Q4, Q6) are intermittently driven to the ON state, if Q1 is selected as the high-side element, Q4 or Q6 is selected as the low-side element.

Although the embodiment and the modification examples of the invention have been described above, the invention is of course not limited to the above-described embodiment and modification examples, and further alterations and modifications are possible without departing from the technical concept of the invention.

REFERENCE SYMBOL LIST

1 Electric compressor
3 Compression mechanism
4 Motor
52 Motor drive circuit
53 Control unit
54 Current detection unit
B Direct-current power source
D Duty ratio $D_0$ Initial duty ratio
H High-pressure line
L Ground line
$I_1$ First threshold
$I_2$ Second threshold
IGBT (Q1, Q3, Q5) High-side elements
IGBT (Q2, Q4, Q6) Low-side elements
Q1 to Q6 Switching Elements (IGBT)

The invention claimed is:

1. An electric compressor comprising:
a compression mechanism for compressing and discharging a refrigerant by rotation;
a motor for driving the compression mechanism;
a motor drive circuit that is connected between the motor and a direct-current power source and provided with multiple switching elements; and
a control unit for performing motor drive control and stop control, wherein the motor drive control drives the motor by controlling drive of the multiple switching elements in response to an external compressor operation command, and the stop control stops rotation of the compression mechanism by performing brake control that turns all the switching elements to an OFF state in response to an external compressor stop command, and then controls driving of a predetermined switching element among the multiple switching elements to apply a load to the motor,
wherein the electric compressor includes a current detection unit that detects a current flowing through the motor drive circuit,
wherein the control unit,
in the brake control, turns all the switching elements to the OFF state when a detected current value that is detected by the current detection unit is higher than a predetermined first threshold, and
in the brake control, adjusts a drive pattern of the predetermined switching element in order to prevent the detected current value from exceeding a predetermined second threshold that is lower than the first threshold when the detected current value is lower than the first threshold.

2. The electric compressor according to claim 1, wherein the second threshold is a peak value of a starting current that is generated at the time of starting the motor drive control.

3. The electric compressor according to claim 1, wherein adjusting the drive pattern of the predetermined switching element in the brake control is performed by changing a duty ratio, for each predetermined cycle, that indicates a percentage of time of the predetermined switching element in an ON state in the predetermined cycle.

4. The electric compressor according to claim 3, wherein at the start of the brake control, the control unit turns the predetermined switching element to the ON state for a time period based on an initial duty ratio that is predetermined for the duty ratio, and then increases the duty ratio by a predetermined ratio when the detected current value is equal to or lower than the second threshold and maintains the duty ratio or decreases the duty ratio by the predetermined ratio when the detected current value is higher than the second threshold.

5. The electric compressor according to claim 1, wherein the multiple switching elements are pairs of high-side and low-side elements in the same phase that are connected in series between the high-voltage line and the ground line of the direct-current power source and are arranged in parallel for different phases,
the predetermined switching element that is subjected to adjusting the drive pattern is all the high-side elements or all the low-side elements, and
the control unit performs, as the brake control, zero-vector energization which simultaneously and intermittently turns all the high-side elements or all the low-side elements to the ON state.

6. The electric compressor according to claim 2, wherein adjusting the drive pattern of the predetermined switching element in the brake control is performed by changing a duty ratio, for each predetermined cycle, that indicates a percentage of time of the predetermined switching element in an ON state in the predetermined cycle.

7. The electric compressor according to claim 2, wherein the multiple switching elements are pairs of high-side and low-side elements in the same phase that are connected in series between the high-voltage line and the ground line of the direct-current power source and are arranged in parallel for different phases,
the predetermined switching element that is subjected to adjusting the drive pattern is all the high-side elements or all the low-side elements, and
the control unit performs, as the brake control, zero-vector energization which simultaneously and intermittently turns all the high-side elements or all the low-side elements to the ON state.

8. The electric compressor according to claim 3, wherein the multiple switching elements are pairs of high-side and low-side elements in the same phase that are connected in series between the high-voltage line and the ground line of the direct-current power source and are arranged in parallel for different phases,
the predetermined switching element that is subjected to adjusting the drive pattern is all the high-side elements or all the low-side elements, and
the control unit performs, as the brake control, zero-vector energization which simultaneously and intermittently turns all the high-side elements or all the low-side elements to the ON state.

9. The electric compressor according to claim 4, wherein the multiple switching elements are pairs of high-side and low-side elements in the same phase that are connected in series between the high-voltage line and the ground line of the direct-current power source and are arranged in parallel for different phases,
the predetermined switching element that is subjected to adjusting the drive pattern is all the high-side elements or all the low-side elements, and
the control unit performs, as the brake control, zero-vector energization which simultaneously and intermittently turns all the high-side elements or all the low-side elements to the ON state.

* * * * *